United States Patent [19]

Grüter

[11] 4,181,608

[45] Jan. 1, 1980

[54] METHOD FOR CONDENSATION OF VAPORS FORMED IN A THERMAL SEPARATOR

[75] Inventor: Johann Grüter, Zurich, Switzerland

[73] Assignee: Luwa AG, Zurich, Switzerland

[21] Appl. No.: 889,095

[22] Filed: Mar. 22, 1978

[30] Foreign Application Priority Data

Mar. 30, 1977 [CH] Switzerland .................. 3969/77

[51] Int. Cl.² .................................... B01D 37/00
[52] U.S. Cl. .................. 210/71; 210/73 S; 210/74; 210/76; 210/78; 210/83
[58] Field of Search ............ 210/152, 65, 70, 71, 210/67, 68, 66, 73 R, 73 S, 76, 74, 77, 78, 178–180, 181–183, 187, 359, 360 R; 23/313 R, 270 R, 269, 267 S; 159/6 R, 11 A

[56] References Cited

U.S. PATENT DOCUMENTS 2,755,293 7/1956 McDonald ..................... 210/152

*Primary Examiner*—Frank Sever
*Attorney, Agent, or Firm*—Werner W. Kleeman

[57] ABSTRACT

A method of, and apparatus for, condensing vapors formed in a thermal separator upon removal of moisture from a material. The vapors are infed to a mechanical separator where there is separated material containing solids and liquids and brought into contact with the material to be separated in the mechanical separator which is effective as a cooling agent, whereby the vapors are condensed.

9 Claims, 3 Drawing Figures

METHOD FOR CONDENSATION OF VAPORS FORMED IN A THERMAL SEPARATOR

BACKGROUND OF THE INVENTION

The present invention relates to a new and improved method of, and apparatus for, condensation of vapors which are formed in a thermal separator upon removal of moisture from a material, particularly suspensions, sludges and the like. Furthermore, it is possible to remove from the material, prior to drying in the thermal separator, liquid in a mechanical separator by subjecting such material therein to a mechanical separation action.

During the thermal removal of liquid from a material it is well known that vapors are formed due to the action of the delivered thermal energy. These vapors thereafter must again be converted into a liquid. This occurs typically by means of separate condensers to which there must be infed a coolant or cooling agent. Apart from the correspondingly great expediture in equipment this state-of-the-art solution is associated with the drawback that there is usually a considerable consumption of cooling agent.

SUMMARY OF THE INVENTION

Hence, with the foregoing in mind it is a primary object of the present invention to provide a new and improved method of, and apparatus for, condensation of vapors in a manner not associated with the aforementioned drawbacks and limitations of the prior art proposals.

Still a further significant object of the present invention aims at providing a new and improved method of, and apparatus for condensing formed vapors in an environmentally protective manner and with great operational reliability, while utilizing relatively simply constructed and operationally reliable equipment.

Another notable object of the present invention is to provide a new and improved method of, and apparatus for, condensation of vapors which are formed in a thermal separator by means of a mechanical separator in a highly efficient, economical and reliable manner.

Now in order to implement these and still further objects of the invention, which will become more readily apparent as the description proceeds, the method aspects of the present invention or the condensation of vapors which are formed in a thermal separator upon removal of moisture from a material, is manifested by the features that the vapors are infed to a mechanical separator for separation of the material containing solids and liquids and then such vapors are brought into contact in the mechanical separator with the material infed therein and which material acts as a cooling agent, thereby condensing the vapors.

According to further specific method aspects of the invention for the removal of liquid from a material containing solids and liquids, especially suspensions, sludges and the like, it is contemplated to remove liquid from the material by mechanical action in at least one mechanical separator and thereafter to dry the treated material in at least one thermal separator under the action of heat. Further, the vapors which are formed in the thermal separator are recycled into the mechanical separator and brought into contact with the material which is infed into the mechanical separator and acting as a cooling agent, thereby condensing the vapors.

Now in order to perform the method aspects of the present invention, and in particular to carry out the last mentioned method, there is contemplated apparatus having at least one mechanical separator for the removal of liquid from the material containing both solids and liquids in a mechanical manner and at least one thermal separator connected after the mechanical separator for drying the pretreated material while subjecting the same to thermal action. The vapor chamber or compartment of the thermal separator is flow connected by at least one connection, specifically a connection line or conduit with the internal compartment of the mechanical separator functioning as a mixing condenser for the vapors.

Since the vapors are returned back into the mechanical separator and brought into contact with the material which is to be treated therein and containing solids and liquids, and vapors condense at the material which acts as a cooling agent. This renders superfluous the use of an externally infed, separate cooling agent. The heat of vaporization released during condensation of the vapors is additionally beneficially employed for heating the material to be treated, thereby increasing the efficiency of the mechanical liquid separation. If the material which is to be treated and containing solids and liquids contains a solvent, then there is realized the further advantage that the removal of this solvent can be accomplished in a closed area or space and under optimum pressure conditions. This, in turn, extensively prevents the danger of polluting the environment.

Preferably the material containing the solids and liquids is distributed over a large surface in the mechanical separator, so that there is afforded a correspondingly large condensation surface for the vapors.

Advantageously, in the mechanical separator the temperature is maintained at a value which is appreciably above the ambient temperature. The mechanical separation thus can be carried out under more favorable conditions.

It is also of advantage if the vapors are returned in countercurrent flow with respect to and in contact with the material which migrates from the mechanical separator to the thermal separator. In this way a heat exchange action occurs between the vapors and the material.

The equipment for performance of the method aspects is advantageously designed such that the thermal separator is mounted directly at the mechanical separator and forms in conjunction therewith a functional unit. With such construction there is avoided the problem of transport of the treated material from the mechanical separator to the thermal separator and which arises conventionally with standard equipment of this type. Additionally, there is facilitated the infeed of the no longer fluent material into the thermal separator.

According to a preferred construction the outlet of the mechanical separator is connected by means of a single connection conduit or line with the inlet of the thermal separator, and in such connection line the material traveling towards the thermal separator and the vapors flow in countercurrent. If the connection line or conduit, which begins below the discharge or output end of the mechanical separator, is vertically arranged, then, under the action of gravity, the material can move from the mechanical separator into the thermal separator.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
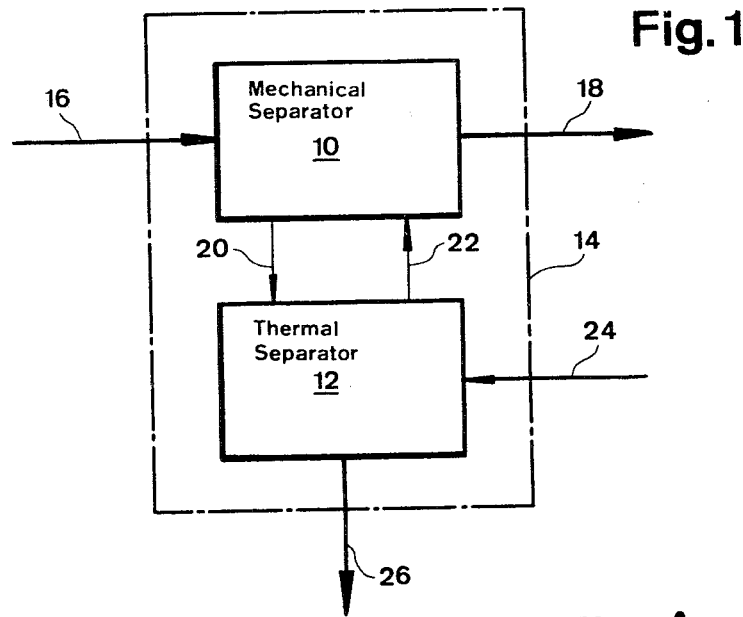
FIG. 1 is a simplified block diagram of equipment designed according to the teachings of the present invention for generally explaining the inventive concepts and particularly the method aspects.

Describing now the drawings, in FIG. 1 reference character 10 designates a mechanical separator and reference character 12 a thermal separator, which collectively form a functional unit 14. The material which is to be treated and containing solids and liquids is infed at the infeed means or location 16 into the mechanical separator 10. This mechanical separator 10 possesses an outlet 18 for the separated liquid and an outlet 20 through which passes the treated material into the thermal separator 12. The latter has a quantity of heat $Q'_{20}$ infed thereto at location 24, under the action of which vapors are formed in the thermal separator 12. These vapors are fed back via the connection 22 into the mechanical separator 10, where they condense and are removed by means of the outlet 18. The finished treated product leaves the thermal separator 12 by means of its outlet or discharge 26.

As a modification of the arrangement of FIG. 1 it is also possible to condense vapors formed in a thermal separator in a mechanical separator, wherein the thermal separator is not connected after the mechanical separator. In this case vapors of a different type i.e. foreign vapors are condensed in the mechanical separator. The thus resultant mixture of the condensate with the different type of liquid which has been mechanically separated in the mechanical separator, is without significance for such situations inasmuch as the separated liquid is not further used. This is especially the case during dewatering of suspensions, sludges and the like.

Figure 2:
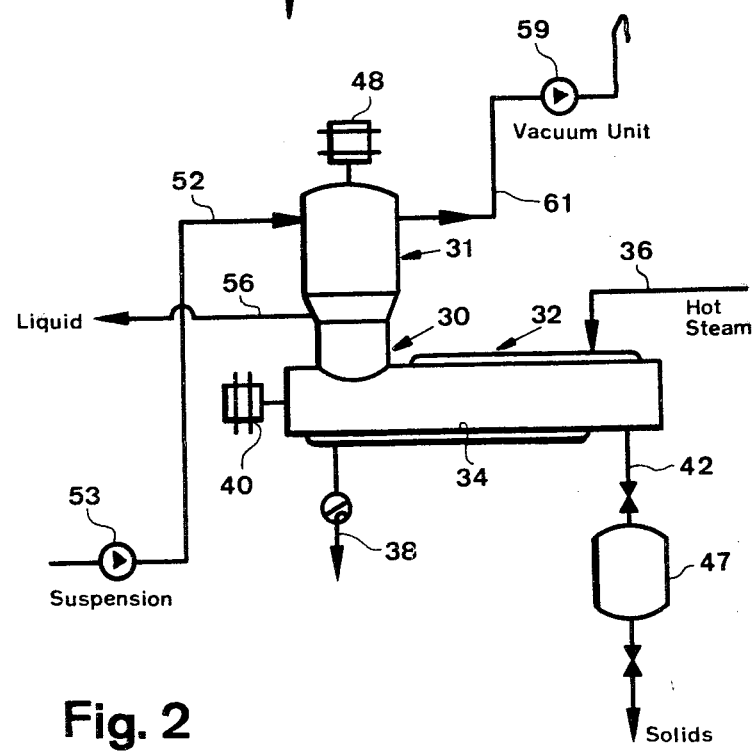
FIG. 2 schematically illustrates a flow diagram for explaining the method of the invention.
Figure 3:
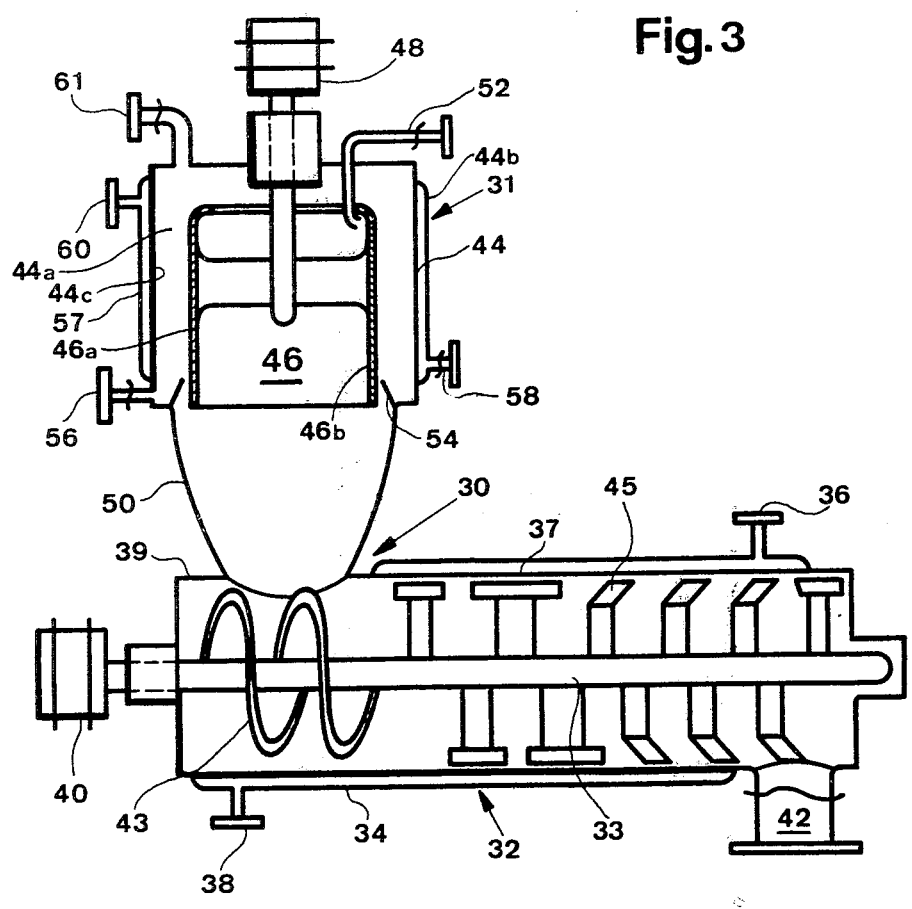
FIG. 3 is a schematic illustration, in longitudinal sectional view, of an exemplary embodiment of apparatus constructed according to the teachings of the invention and useful for the practice of the method aspects.

Turning attention now to FIGS. 2 and 3 it is to be understood that generally the same reference characters have been employed for the same parts, and wherein the entire mechanical-thermal separation equipment for the practice of the method aspects has been designated in its entirety by reference character 30. This equipment possesses as the mechanical separator 31 a centrifuge or a decanter having an essentially cylindrical housing 44, as shown in FIG. 3, in which there is rotatably mounted a rotor 46 about a vertical axis of rotation. The hollow rotor 46 is designed to be rotationally symmetrical, and furthermore, possesses a shell or jacket 46a pervious to the liquid and driven by a suitable drive motor 48. Below the rotor 46 there is arranged a connection conduit or connecting piece 50 or equivalent structure which operatively interconnects the mechanical separator 31 with a thermal separator 32. It is advantageous if the connection conduit or connecting piece 50 is vertically arranged, so that the material emanating from the rotor 46 reaches in free fall the thermal separator 32 by means of such connection conduit 50. Yet, it is to be understood that it would be equally possible to use a curved or inclined extending connection conduit or pipe.

A feed pipe or conduit 52, operatively connected with a pump 53, as shown in FIG. 2, opens in such a manner into the mechanical separator 31 that the starting material to be treated i.e., the material to be treated containing solids and liquids, reaches the inner surface 46b of the rotor 46. Arranged in the internal chamber or compartment 44a of the housing 44 is a catch trough 54 with which there is connected an outflow conduit or pipe 56 for the separated liquid.

The housing 44 possesses a double-wall construction, generally designated by reference character 44b, and the outer jacket or wall 57 has an infeed line or conduit 58 and an outfeed line or conduit 60 for any suitable heat exchange medium. Further, there is provided a device 59 shown in FIG. 2 for generating a higher or lower pressure in the interior or inner compartment 44a of the mechanical separator 31 and which is connected with a connection pipe or conduit 61 which opens into such inner compartment of the housing 44. By way of example, such device 59 may be a vacuum unit.

The mechanical separator 31 can be designed such that the rotor 46 has either a horizontal axis or vertical axis and such rotor 46 can have a cylindrical or conical configuration. Furthermore, the mechanical separator 31 is structured such that the material to be treated is distributed in a manner such that there is provided for such material a large surface at which the vapors can condense. Therefore, there can be used as the mechanical separator, apart from centrifuges and decanters which fulfill the aforementiond conditions, also propelling devices and filters.

The thermal separator 32, in the arrangement under consideration, comprises a horizontal dryer having an essentially cylindrical housing 39 within which there is rotatably mounted a rotor 33 having an essentially horizontally extending axis of rotation. The cylindrical treatment compartment or chamber 37 which surrounds the rotor 33 is encased by a heating jacket or casing 34 having an inflow or infeed conduit 36 and an outflow or outfeed conduit 38 for any suitable heat exchange medium. The rotor 33 is equipped with conveyor or feed elements 43 and distributor elements 45 and is driven by a suitable drive motor 40. The connection conduit or connecting piece 50 leading to the mechanical separator 31 opens at the inlet end 32a of the thermal separator 32 constituting the dryer unit, whereas at the opposite, discharge-side end 32b there is provided an outlet connection or pipe 42 or equivalent structure. This outlet connection 42 opens into a not particularly illustrated receiving or catch vessel or leads to an outfeed sluice 47 (FIG. 2) if the separation process is carried out at negative pressure or excess pressure.

The thermal separator 32 is preferably a contact dryer in which the material to be treated comes into contact with its heated wall 32c. The rotor 33 which is equipped with the conveyor elements 43 and distributor elements 45 insures for satisfactory heat transfer and good admixing of the material which is being processed. For this purpose there can be employed the most different types of contact dryers, such as paddle dryers and belt-type or conveyor dryers, preferably those having horizontal axis.

However, it is also conceivable to equip the mechanical separator and the thermal separator with a transport device, for instance a transport or conveyor belt, for the pre-dried material and with a connection conduit or pipe for the return of the vapors, wherein, however, there prevail in both of the separation devices or separators the same pressure conditions.

With the illustrated exemplary embodiment the mechanical separator 31 and the thermal separator 32 are, however, interconnected with one another in flow communication by means of a single connection conduit or connecting piece 50, and the vapors flow in countercurrent with respect to the material to be treated which is moving into the thermal separation device or separator 32.

The thermal separator 32 and also the mechanical separator 31 can be conceivably equipped with devices which operate both continuously as well as in groups or sets. It is preferable, however, for at least the mechanical separator 31 to operate continuously.

During operation of the apparatus 30 the rotors 46 and 33 are driven by the related drive motors 48 and 40, respectively. The material to be treated and containing the solids and liquid(s) is delivered by the pump 53 shown in FIG. 2 through the conduit or line 52 to the inner surface or wall 46b of the rotor 46 and at that location distributed upon such inner surface due to the rotation of this rotor 46. Due to the action of the centrifugal force the liquid contained in the infed material penetrates through the pervious jacket or shell 46a of the rotor 46 to the inner wall 44c of the housing 44. At that location there is formed a liquid film which flows downwardly into the trough or channel 54 and departs from the housing 44 by means of the conduit or line 56. The thus pretreated material and the residual substances, respectively, drop under the action of the force of gravity out of the rotor 46 downwardly and through the connection pipe or connecting piece 50 into the thermal separator 32. There the material is acted upon by the rotor 33 and uniformly distributed at the inner surface or wall 32c of the treatment compartment or chamber 37 and slowly conveyed in the direction of the connection piece or outlet 42. Since the shell or casing 34 is heated there occurs extensive vaporization of the liquid still contained in the material. The thus formed vapors or the like move through the connecting piece 50 into the mechanical separator 31 and condense, like in a mixing condenser, at the material distributed over a large surface at the inner wall 46b of the rotor as well as at the mechanically separated liquid droplets and arrive in the form of condensate at the trough 54. Stated in another manner, the mechanical separator 31 functions as a condenser for the vapors. The material infed by means of the conduit 52 into the mechanical separator 31 serves to cool such mechanical separator. If, however, depending upon the nature of the treated material, this cooling action of the infed material is not sufficient, then it is possible to cool the housing 44 by means of a cooling agent flowing through the double-wall jacket or shell 57. The dry material leaves the thermal separator 32 by means of the connecting piece or outlet 42.

There is insured that in the mechanical separator 31 there prevails a temperature which considerably lies above the ambient temperature, a temperature in the range of 40° C. to 150° C., preferably 60° C. to 100° C., since thereby the efficiency of the mechanical liquid separation can be appreciably increased, and thus, it is necessary to thermally separate or vaporize less liquid, resulting in a considerable saving in energy. This is especially rendered possible due to the beneficial utilization of the heat of vaporization, released during condensation of the vapors, for heating the material to be treated.

Since certain substances tend to adhere to the inner wall 46b of the rotor 46, it is contemplated for such situations to provide a mechanical rotor cleaner, which may be of conventional design and therefore not further here shown.

Equally, it is possible to provide a device which sterilizes the treated material, whether such be by means of ultraviolet or other radiation having an even shorter wavelength.

With the equipment of the invention it is possible to process materials which can be handled by a pump, especially suspensions, sludges and the like. The liquid part can be water as well as also solvents and mixtures thereof.

If necessary, it is possible to connect in series a number of mechanical separators and a number of thermal separators.

In the description to follow there are given numerical examples relating to the dewatering of a chemically conditioned sludge.

| Infeed Quantity and Composition: | |
|---|---|
| Quantity | 500 kg/h |
| Dry Content | 3 % |
| Temperature | 15° C. |
| Dried Sludge: | |
| Quantity | 300 kg/h |
| Dry Content | 50 % |
| Temperature | $\neq$100° C. |
| Withdrawn Water: | |
| Quantity | 4700 kg/h |
| Temperature | 76° C. |
| Consumption of Operating Materials: | |
| Hot Vapor | about 600 kg/h |
| Electrical Energy | about 25 kW |
| Cooling Water | None |

From the above it will be apparent that there was separated a total of 4,700 kg/h water which was present at a temperature of 76° C. and was available for further use, in contrast to heretofore known methods. Additionally, no cooling agent was needed.

While there are shown and described present preferred embodiments of the invention, it is to be distinctly understood that the invention is not limited thereto, but may be otherwise variously embodied and practiced within the scope of the following claims. Accordingly,

What I claim is:

1. A method of removing liquid from a material containing solid and liquid substances, consisting of suspensions and/or sludges, comprising the steps of:
    providing at least one mechanical separator;
    infeeding the material into the mechanical separator for mechanically removing liquid therefrom in said mechanical separator;
    providing at least one thermal separator;
    after the removal of the liquid from the material in said mechanical separator, infeeding the thus pretreated material into said at least one thermal separator;
    drying under the action of heat the pre-treated material in said at least one thermal separator, while forming vapors in said thermal separator;

providing a flow path being sufficiently dimensioned to allow for upward passage of substantially all of the vapors between said mechanical separator and said thermal separator;

feeding substantially all of the vapors formed in the thermal separator into said at least one mechanical separator;

bringing the thus fed vapors in the mechanical separator into contact with the material therein which serves as a cooling agent; and condensing substantially all of said vapors due to contact thereof with said material in said at least one mechanical separator.

2. The method as defined in claim 1, further including the steps of:

distributing the material containing the solid and liquid substances over a large surface within said mechanical separator.

3. The method as defined in claim 1, further including the steps of:

maintaining the temperature within said mechanical separator at a value which is appreciably greater than the ambient temperature.

4. The method as defined in claim 3, wherein:

said temperature is maintained in a range of about 40° to 150° C.

5. The method as defined in claim 1, further including the steps of:

feeding the vapors in countercurrent and in contact with the material moving from the mechanical separator to the thermal separator.

6. The method as defined in claim 1, further including the steps of:

continuously operating at least said mechanical separator.

7. The method as defined in claim 1, further including the steps of:

accomplishing removal of the liquid at a negative pressure.

8. The method as defined in claim 1, further including the steps of:

accomplishing the removal of liquid at an excess pressure.

9. The method as defined in claim 1, further including the steps of:

providing a single liquid outlet for both the mechanical separator and the thermal separator; and said single liquid outlet being part of the mechanical separator for the removal of liquid therefrom.

* * * * *